United States Patent
Sadek et al.

(10) Patent No.: US 7,412,662 B2
(45) Date of Patent: Aug. 12, 2008

(54) METHOD AND SYSTEM FOR REDIRECTION OF TRANSFORMED WINDOWS

(75) Inventors: Mohamed Sadek, Redmond, WA (US); Hiro Yamamoto, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 10/823,276

(22) Filed: Apr. 12, 2004

(65) Prior Publication Data

US 2005/0229108 A1  Oct. 13, 2005

(51) Int. Cl.
*G06F 3/048* (2006.01)

(52) U.S. Cl. .................. 715/781; 715/764; 715/798; 715/799

(58) Field of Classification Search .......... 715/781, 715/788, 856, 862; 345/355, 358
See application file for complete search history.

(56) References Cited

U.S. PATENT DOCUMENTS

| | | | |
|---|---|---|---|
| 4,646,075 A * | 2/1987 | Andrews et al. ............ 345/440 |
| 5,047,760 A | 9/1991 | Trevett et al. |
| 5,161,212 A | 11/1992 | Littleton |
| 5,245,702 A | 9/1993 | McIntyre et al. |
| 5,321,807 A | 6/1994 | Mumford |
| 5,363,483 A | 11/1994 | Jones et al. |
| 5,388,207 A | 2/1995 | Chia et al. |
| 5,522,025 A | 5/1996 | Rosenstein |
| 5,634,100 A | 5/1997 | Capps |
| 5,710,896 A | 1/1998 | Seidl |
| 5,764,215 A * | 6/1998 | Brown et al. ............... 345/620 |
| 5,815,149 A | 9/1998 | Mutschler, III et al. |
| 5,835,096 A | 11/1998 | Baldwin |
| 5,838,315 A * | 11/1998 | Craycroft et al. ........... 715/866 |
| 5,880,733 A * | 3/1999 | Horvitz et al. .............. 715/850 |
| 6,088,698 A | 7/2000 | Lipkin |
| 6,104,392 A | 8/2000 | Shaw et al. |
| 6,229,542 B1 * | 5/2001 | Miller ....................... 715/782 |
| 6,330,003 B1 | 12/2001 | Curtis et al. |
| 6,396,473 B1 | 5/2002 | Callahan et al. |
| 6,397,262 B1 | 5/2002 | Hayden et al. |
| 6,518,976 B1 | 2/2003 | Curtis et al. |
| 6,547,397 B1 | 4/2003 | Kaufman et al. |
| 6,549,218 B1 | 4/2003 | Gershony et al. |
| 6,593,969 B1 | 7/2003 | Driscoll Jr, et al. |
| 6,597,358 B2 * | 7/2003 | Miller ....................... 345/427 |
| 6,608,640 B1 | 8/2003 | Nagahara et al. |
| 6,630,942 B2 | 10/2003 | Gerra et al. |
| 6,717,595 B1 | 4/2004 | Yennaco |

(Continued)

*Primary Examiner*—Stephen Hong
*Assistant Examiner*—Omar Abdul-Ali
(74) *Attorney, Agent, or Firm*—Merchant & Gould, P.C.

(57) ABSTRACT

Methods, systems, and computer-readable media are disclosed for redirecting an input to or from an application via a transformed window on a display device while maintaining the transformed window transparent to the application. A window transformation application program interface coupled with a window manager comprises a desktop window manager that facilitates the transparency. The desktop window manager, through the transformation API incorporates a transformation matrix that is used to transform the window from the application on the display. A mouse (or other input device) hit testing routine is incorporated into the desktop window manager to map an input device point to the transformed window, perform an inverse transform on the input device point if it is associated with the transformed window, before sending an input device message associated with the input device point on to the application. In this way, the application need not be aware of the transformation.

20 Claims, 9 Drawing Sheets

U.S. PATENT DOCUMENTS

| | | |
|---|---|---|
| 6,717,596 B1 | 4/2004 | Nason et al. |
| 6,721,950 B1 * | 4/2004 | Lupu ............................ 719/310 |
| 6,822,662 B1 * | 11/2004 | Cook et al. .................. 715/788 |
| 6,901,554 B1 | 5/2005 | Bahrs et al. |
| 6,918,093 B2 | 7/2005 | Broussard |
| 6,954,218 B2 * | 10/2005 | Stall ............................ 345/654 |
| 6,954,933 B2 | 10/2005 | Stall |
| 6,993,773 B2 | 1/2006 | Broussard |
| 7,088,374 B2 | 8/2006 | David et al. |
| 2002/0075327 A1 | 6/2002 | Stall |
| 2002/0180784 A1 | 12/2002 | Broussard |
| 2003/0214533 A1 | 11/2003 | Cull et al. |
| 2004/0100480 A1 | 5/2004 | Lupu |
| 2004/0179017 A1 | 9/2004 | Martyn et al. |
| 2005/0010876 A1 | 1/2005 | Robertson et al. |

* cited by examiner

— — — — Window Rectangle
— — — — Window Region

METHOD AND SYSTEM FOR REDIRECTION OF TRANSFORMED WINDOWS

CROSS REFERENCE TO RELATED APPLICATIONS

This application is related to U.S. patent application Ser. No. 10/692,322, filed on Oct. 23, 2003, the disclosure of which is incorporated by reference herein in its entirety.

TECHNICAL FIELD

The present invention relates generally to the field of graphical user interfaces and more particularly to a method and system for transparently redirecting windows and objects in a window in a display screen to a different place on the display screen or other output device.

BACKGROUND OF THE INVENTION

A visual display such as a graphical user interface like a "desktop" display presented by software typically includes objects and containers. An object can be any item on a visual display. A container can be an object upon or within which other objects are presented. For example, a container, such as a spreadsheet or word processing document in a window, or a particular icon, may include a number of objects, such as cells, graphics, user interface elements, and others. The objects within such a container may have a defined presentation size, position, etc. on the display screen.

Typically, a body of code within the specific application is responsible for arranging elements of a visual display such as objects and containers. For example, an application program presenting a number of objects includes code representing a layout editor, sometimes referred to as a "form editor" or "2D editor," for arranging and/or editing the appearance of the containers and objects presented by that application. However, to function properly, the layout editor requires specific, prior knowledge of the parent container for the objects to be edited. In addition, a user input device, such as a mouse pointer, is typically positioned over the container and clicked in order to perform a function on the object. Thus there needs to be a one to one correspondence between the absolute position of the pointer and the position of the object in the container for the indicated operation to convey the correct command or information.

Currently, applications send image and object and container data directly to a video display screen in a streaming fashion. If a developer wants to change or transform the object in any way there is no way to intercept the stream going from the application directly to the screen. Thus any manipulation requires the developer to go into the code of the application itself in order to modify or transform the presentation of the object or the container in any way. This is a code intensive operation and application specific, with each such iteration requiring a substantial expenditure of time and effort, with the result not being transferable to other applications or platforms.

In an operating system such as Microsoft's Windows XP® operating system, for example, the window manager directs application content directly to the display screen. Thus there is no way for a developer who desires to perform some manipulation on the content, or add an effect to the display content, cannot modify it because the window content is not stored anywhere. The application simply takes a stream of data and sends it to the screen.

A desktop "compositor" engine (DCE) has been developed to facilitate redirection of the content of the current application window stream to an intermediate off screen location prior to sending it to the display screen. This facilitates manipulation of the window content, which can then be transformed and then transmitted to the screen or simply passed through if no transformation is being performed.

However a difficulty arises when a user is to interact with an object on the transformed display screen. For example, assume that an object like a square figure is transformed to a circular shape and repositioned from an x,y absolute position to an x+a, y+b actual position on the display. If a user then positions his input device, e.g. a mouse pointer over the image now displayed at x+a, y+b and clicks on the image, the command will not be received, since the pointer is not over the position that corresponds to the application's object.

For the layout editor conventionally to have such specific knowledge of the parent container and change properties of the container and objects within that container based on that knowledge and the editing operation, the layout editor of the application consists of extensive code. Further complicating matters, an object may be placed in an arbitrary location in a container that may arbitrarily arrange its children. Also, resizing the object may adversely affect the arrangement of the children as well as the parent container itself. Therefore, the changes made by the layout editor may be ineffective.

As such, there is currently no simple manner in which an application interface may resize, re-arrange or otherwise transform windows or objects in windows on a display without application specific code specific to each application. Further, if an application is unaware of an existing mechanism for supporting a transformation such as supporting High dots per inch (DPI) display, the application will not be able to properly display in a High DPI window. It is with respect to these considerations and others that the present invention has been made.

SUMMARY OF THE INVENTION

The input redirection system and methods of embodiments of the present invention enables existing applications to transparently handle input without any application code modification when applying arbitrary 2D or 3D transformation(s) to the application output for display on the screen. In an illustrative embodiment discussed in more detail below, the invention changes the way the window manager handles input for transformed windows.

In accordance with the present invention, a window transformation application program interface coupled with a window manager comprises a desktop window manager that facilitates the transparency. The desktop window manager, through the transformation API, incorporates a transformation matrix that is used to transform the window from the application on the display. Conversely, a mouse (or other input device) hit testing routine that is incorporated into the desktop window manager to map an input device point to the transformed window, is used to perform an inverse transform on the input device point if it is associated with the transformed window, before sending an input device message associated with the input device point on to the application. In this way, the application remains unaware of the transformation.

More particularly, an embodiment of the present invention may be viewed simply as a method for determining whether an input message associated with an input location point belongs to a display window associated with an application, wherein the window has been transformed on the display by a transformation matrix. This method includes operations of determining a bounding rectangle bounding the window transformed by the transformation matrix, determining whether the input device point is within the bounding rectangle, performing an inverse transformation on the input device location point if the input device point is within the bounding rectangle. The resulting redirected location point and its associated message are then communicated to the application.

In accordance with other aspects, the present invention relates to a system for maintaining an application window on a display that has been transformed by a transformation matrix into a transformed window transparent to an application that originated the application window. The system includes a desktop window manager operable to transform a window transmitted by the application for display to a transformed window on the display, a redirection transform application interface coupled to the manager, and an external input coupled to the desktop window manager, wherein messages to and from the application pass through the transform interface to and from the manager to maintain transparency between the transformed display window and the application. The system also comprises a processor and a memory coupled with and readable by the processor. The memory contains instructions that, when executed by the processor, cause the processor to determine whether an input message associated with an input location point belongs to a display window associated with an application, wherein the window has been transformed on the display by a transformation matrix. The processor also determines a bounding rectangle bounding the window transformed by the transformation matrix, determines whether the input device point is within the bounding rectangle, performs an inverse transformation on the input device location point if the input device point is within the bounding rectangle and then the resulting redirected location point and its associated message are communicated to the application.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
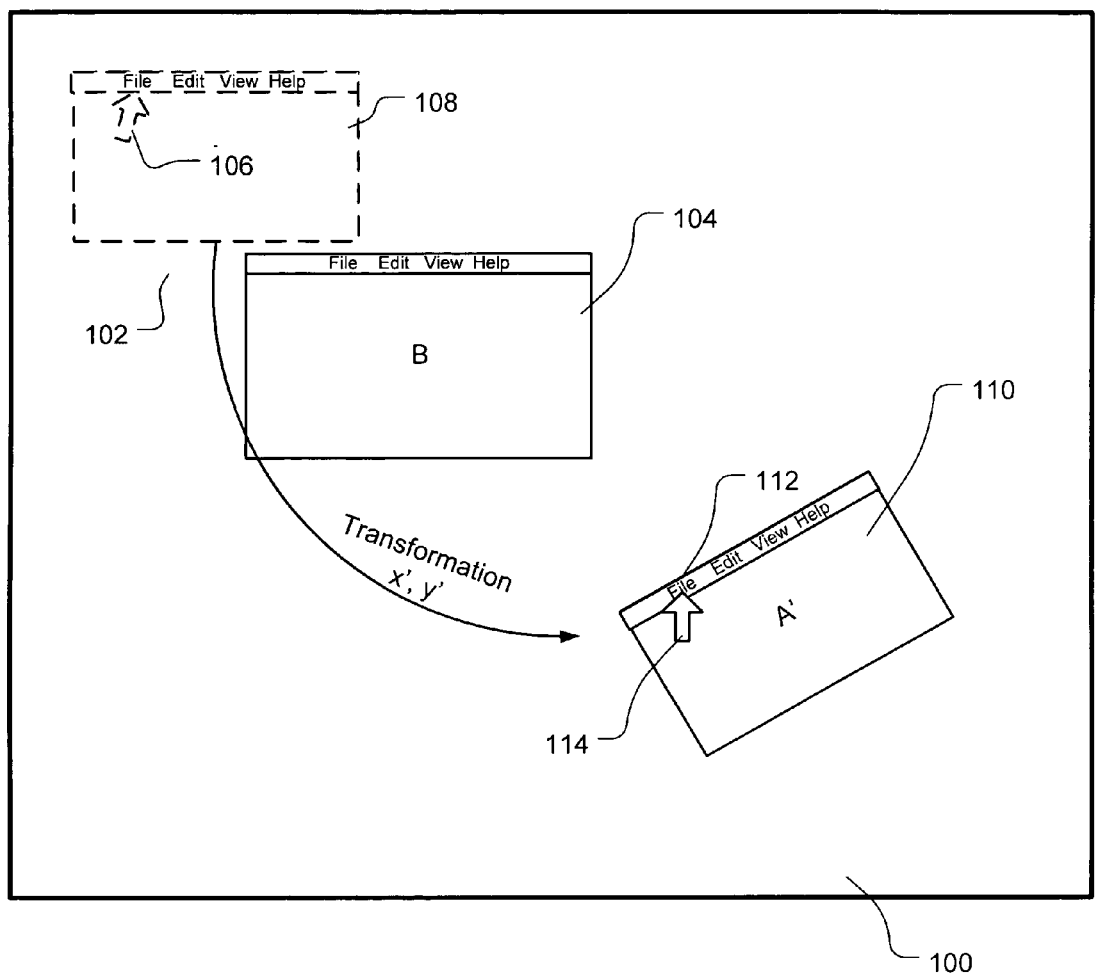
FIG. 1 illustrates transformation of a window on a display according to an embodiment of the present invention.
Figure 5:
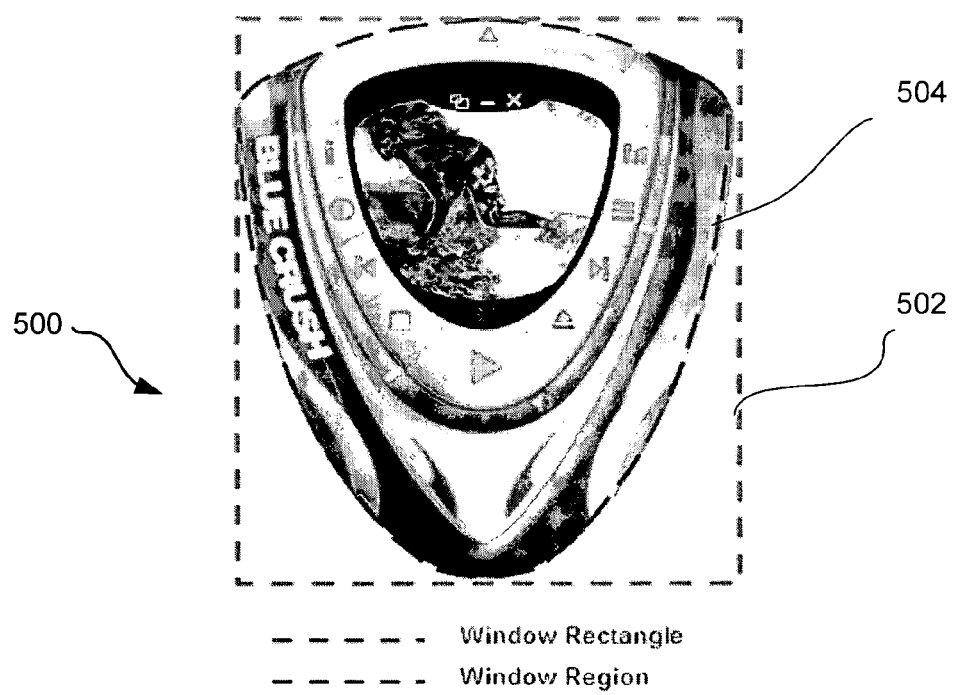
FIG. 5 is an illustration of a non rectangular window with custom window region in an embodiment of the present invention.
Figure 6:
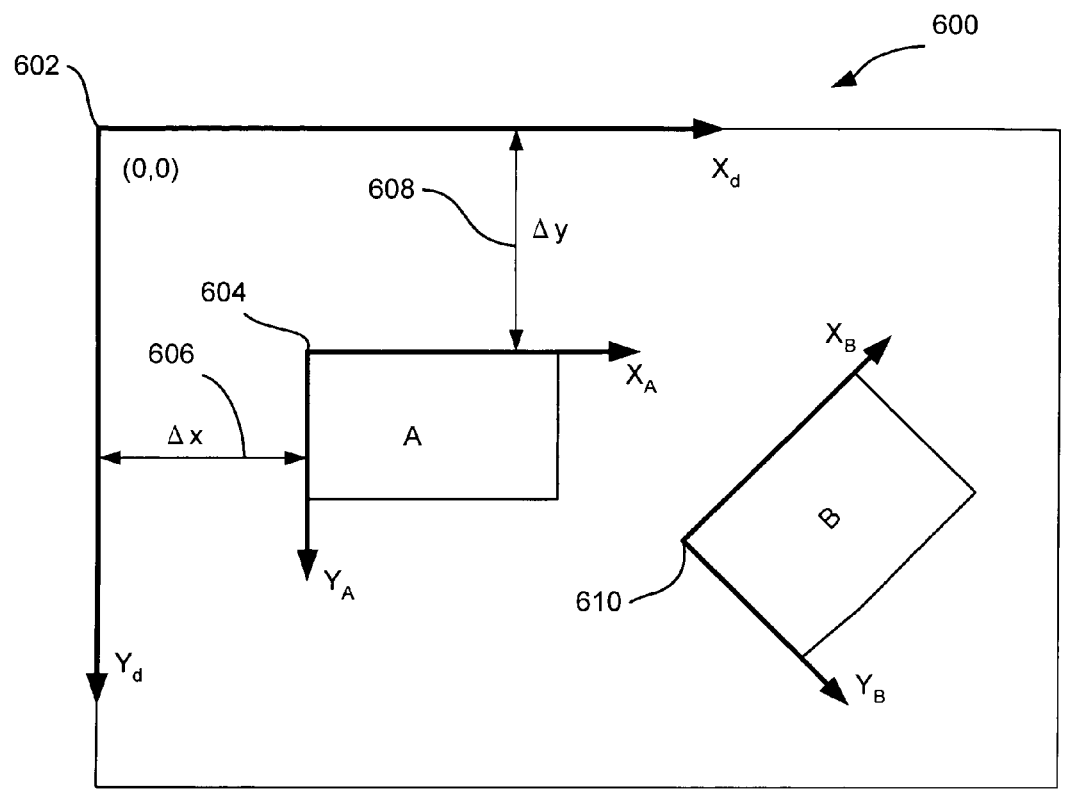
FIG. 6 is an illustration of the coordinate systems utilized in a display including a translational coordinate system and a transformed system in embodiments of the present invention.

A simple window transformation in accordance with one embodiment of the present invention is shown in FIG. 1. Here a graphical user interface, in this case, a desktop 100 is shown on a display. An application program original window A (102) is shown in dashed lines in an upper left region of the desktop 100, as this original window A is not seen. It is, in fact, what the application program thinks is on the display desktop 100. This same window, when translated and resized appears as window B (104) at a different location on the desktop 100. More generally, this same window A (102) can be transformed via a function of x',y' into a translated and rotated window A' (110). The transformation in accordance with the present invention may involve any arbitrary transformation such as a two dimensional or three dimensional transformation. An exemplary 3 dimensional transformation 600 is shown in FIG. 6, in which a rectangular application window 602 is transformed into a 3 dimensional window region 604. Another is shown in FIG. 5.

As will be discussed in more detail below, the application continues to consider the window at dashed position A, with a pointer 106 located under the pull down menu "file" in the non-client area 108, even though a transformation in accordance with the present invention has been performed such that the desktop display 100 shows the window 110 in the lower right of the desktop and the pointer 114 located at an entirely different location on the desktop, yet within the appropriate position in the nonclient area 112 of the transformed window 110.

The operations of the various embodiments of the present invention are implemented (1) as a sequence of computer implemented acts, operations, or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 2:
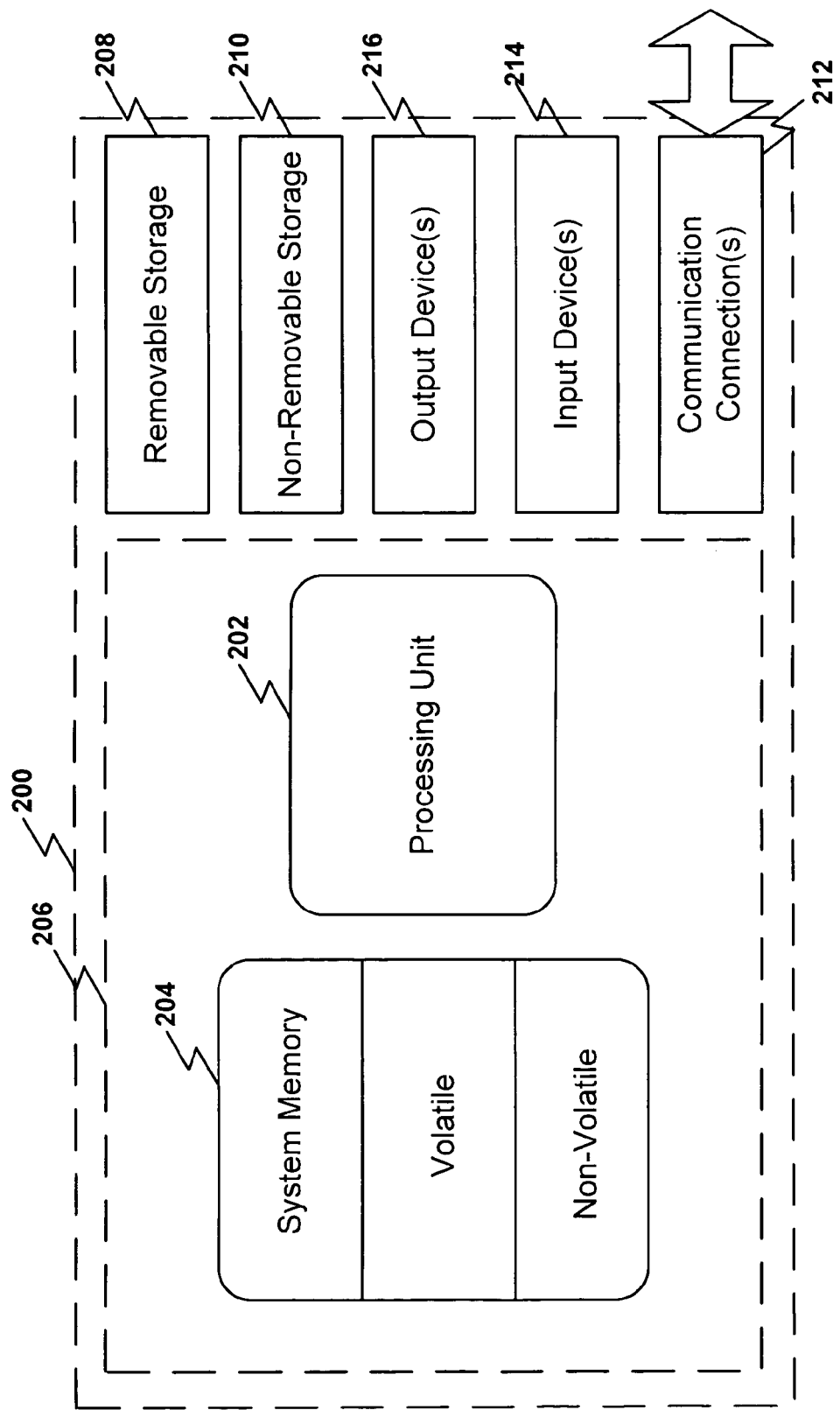
FIG. 2 illustrates an example of a suitable computing system environment on which embodiments of the invention may be implemented.

FIG. 2 illustrates an example of a suitable computing system environment on which embodiments of the invention may be implemented. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 typically includes communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here. A computing device, such as system 200, typically includes at least some form of computer-readable media. Computer readable media can be any available media that can be accessed by the system 200. By way of example, and not limitation, computer-readable media might comprise computer storage media and communication media.

Figure 3:
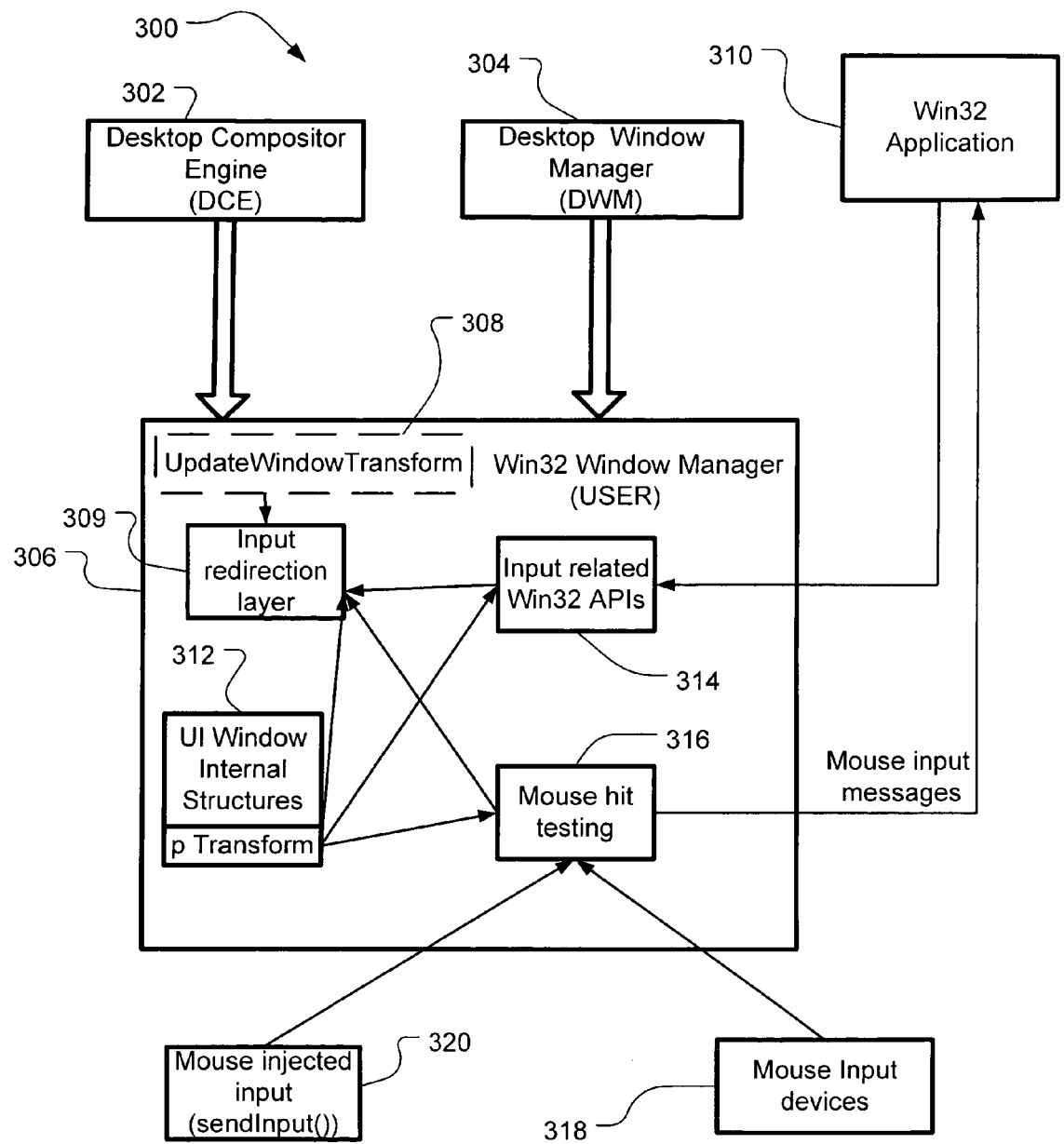
FIG. 3 illustrates functional components of a desktop window manager system incorporating redirection of input operations according to the embodiment of the present invention illustrated in FIG. 1.

An exemplary top level structural diagram of a Graphical User interface system 300 utilizing the present invention is shown in FIG. 3. A desktop compositor engine (DCE) 302 and a desktop window manager (DWM) module 304 provide information and desktop control flow to a Win32 Window manager 306. The DCE composes windows to be used in the output display such as desktop 100. The DWM together with the Win32 Window manager manage the hierarchy of windows as they are displayed on the display desktop 100. The input to the manager system 306 from the DCE 302 and the DWM module 304 pass through an "UpdateWindowTransform" application program interface (API) 308 in accordance with the present invention. An application 310 is unaware of any transform being performed on its display thread via the UpdateWindowTransform 308.

The Win32 Window Manager 306 includes tree structured user interface internal structures 312, input related APIs 314, and mouse hit testing routines 316 that facilitate coordination of input device communication between the display windows, the input devices such as a mouse input device 318 and/or injected input 320, and the application 310. The window manager 306 basically has two ways of receiving input from input devices: through an actual mouse device as in 318 and through another application injected input via the (SendInput()) command string. The internal structures 312 provide transform information to both the input related Win32 API module 314 and the mouse hit testing module 316.

The DWM 304 can change the placement of a Win32 top level window on the screen by changing the window origin and/or the window shape by applying a 3D transformation on the window. The transformation could be either temporary (for example, a fancy animation effect while transiting a window from normal to minimized state) or permanent (for example, changing the semantics for "minimizing" a window to project the window to the side of the desktop). One important application for windows transformation is scaling a window for high DPI unaware applications 310 to look better on high DPI display device that are getting more and more popular and available today.

Since applications (as well as USER internal data structures) are unaware of window placement changes as a result of applying a transformation 308, input redirection is needed so that applications receive the input they expect (i.e. consistent with where they "think" they are on the display screen or desktop). An input redirection abstraction layer 309 is introduced to the system to achieve this. The following detailed description focuses on mouse (and like device) input redirection since keyboard input redirection is generally not needed with the current platform design architecture, and mouse input redirection is illustrative of the present invention.

Throughout this document, the term "classic window manager" is used to refer to the Win32 subsystem window manager component commonly known as "USER" while the term "Desktop window manager" (DWM) will be used to refer to the manager 300 that incorporates with the desktop compositing engine (DCE) 302 to provide a unique user interface experience in accordance with the present invention.

Figure 4:
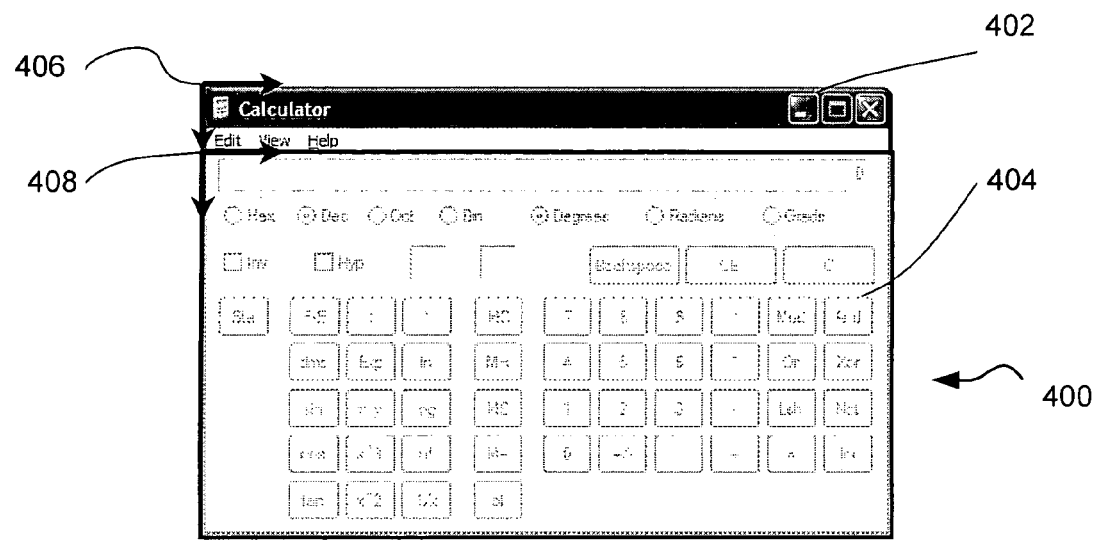
FIG. 4 is an illustration of an exemplary window showing client and non-client domains in an embodiment of the present invention.

The term "Window" will be used throughout this description to refer to a Win32 system window that an application 310 interacts with by using a window handle of type "HWND" by using Win32 window manager related APIs (commonly known as USER32 APIs). Referring now to FIG. 4, the area occupied by a window 400 on the display screen or desktop 100 can be divided into two areas: a non-client area 402 and a client area 404. The non-client area 402 is the area of the window that contains user interface elements common to most windows of the system (for example (minimize, restore and close buttons, and pull down menu buttons). Rendering of this window area on the screen 100 as well as managing mouse input within the non-client area 402 is typically controlled by the system though the system generally provides means for applications 310 to override that functionality. The domain of the non-client area of the window 400 is defined from the window origin 406 and extends generally in the direction of the arrows from the origin 406. The client area, 404, on the other hand, is the area of the window 400 that contains application provided contents. Rendering of this window area on the screen as well as managing mouse input within the client area is typically controlled by the application 310. The domain of the client area of the window 400 is defined from the client origin 408 in the window 400 in the direction of the arrows shown.

The Win32 manager subsystem window manager 306 allows an application 310 to specify a custom region for the window. This allows an application 310 to have, for example, a fancy looking, non rectangular window shape such as is illustrated in FIG. 5. The rectangular original window area is represented by the dashed line rectangle 502. The window region 504 is outlined by the curved dashed line. In this example, all window rendering as well as mouse input hit testing, described in detail below, is restricted only to the window area that falls within the window region 504.

The Win32 subsystem 302 provides a way for applications 310 to simulate sending input to the foreground window as if the input is coming from the physical input device (mouse, keyboard and alike devices) via the use of SendInput API, i.e. injected mouse input 320. This is commonly referred to as injected input since it is not a result of end user interaction with a physical input device. Rather it is a result of a direct instruction from another program.

The term "physical coordinates" will be used throughout this description to represent the current mouse coordinates as seen by the system 300 as well as by input devices such as mouse input device 318.

The term "logical coordinates" will be used throughout this description to represent the current mouse coordinates as seen by the application 310. In other words, these are the coordinates used to deliver mouse related messages to the application 310 after transforming it, through UpdateWindowTransform 308 in input redirection abstraction layer 309, to meet application expectations. If no transformation is applied, logical coordinates will resolve to physical coordinates.

Although all Win32 mouse messages use the screen origin as the coordinate system reference point, application windows might not be interested at all in outside-the-window world. For example, applications can use mouse input to do custom hit testing for a child window. Clearly, this is independent of where the window, such as A' in FIG. 1, is placed relative to other top level windows or to the screen origin. An application such as application 310 may use mouse input messages (always delivered relative to the screen origin) in a manner that is global. For example, to track mouse pointer 114 or to determine which window the mouse pointer is on top of. Clearly, this is dependent on the relative positioning of other windows from the screen origin.

While for a non transformed window the relation between the desktop coordinate origin (i.e. the desktop origin) and the local coordinate origin (i.e. the window coordinate origin) is a linear displacement in the X and/or Y directions, this is not true for a transformed window. This is illustrated in FIG. 6. In this figure, a screen or desktop 600 is shown. Screen 600 has a desktop origin 602 in the upper left corner, by convention. The domain of the screen 600 extends in directions Xd and Yd. A translated window A has its local origin 604 defined by its distance from the x and y axes, namely, by distances $\Delta x$ 606 and $\Delta y$ 608 from the desktop origin, The fact that applications used to translate desktop coordinates to local coordinates (and vice versa) by using the x and y deltas between the coordinate system origins is the major application compatibility issue facing the input redirection feature of the present invention since a more complex, and robust translation system is now needed to map from one coordinate system to the other in order to handle application of an arbitrarily complex 3D transformation. A simplified 2D transformation is also shown in FIG. 6 by window B, in which its origin 610 is not only translated from the desktop origin but also rotated about the origin 610.

Figure 7:
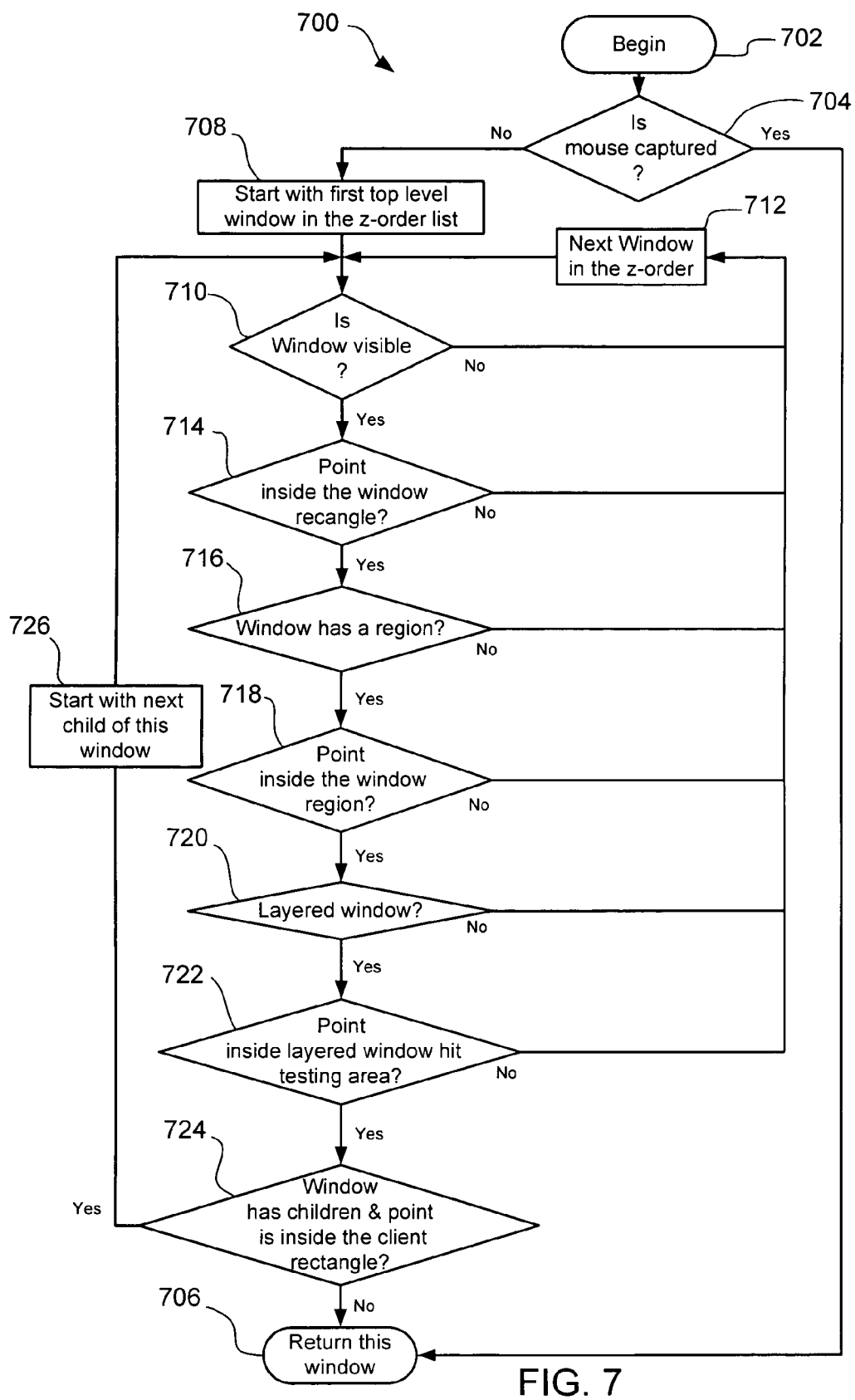
FIG. 7 is a flowchart of logical operations in a mouse speed hit test routine in a simple embodiment of the present invention.

An explanation of how a mouse message, such as a move or button click, finds its way from the mouse device 318 to the target window B shown in FIG. 1 will now be described. First, the raw input thread (RIT) to the Win32 Window Manager 306 opens the mouse device 318 for read during session initialization. When there are some mouse activities (move or button clicks), the Desktop thread (DT) receives mouse input from the mouse driver via an APC call. Then the DT coalesces the mouse input, stores it into a queue in the mouse hit testing module 316 and singles the RIT to wake up and process it. In an identical manner, injected input via "sendinput()" 320 reaches the same queue as physical input from device 318. The RIT wakes up and process the input to determine what message queue the input should go to as follows. If the mouse is captured, the RIT uses the capturing window message queue as the target queue. In particular, a window can capture the mouse input by calling SetCapture(). This forces the system to send mouse messages to the capturing window's WinProc even if it belongs to another window. This continues till the application calls ReleaseCapture() or some certain conditions are met. If the mouse is not captured, the RIT does a speed hit test cycle to determine the target queue. FIG. 7 illustrates the speed hit testing logic flow.

The speed hit test cycle routine 700 begins in operation 702 when called by the RIT. Control then transfers to query operation 704 where the question is asked whether the mouse input has been captured by a window. If the answer to the query is yes, the mouse input has been captured, control transfers to return operation 706 and control returns to the calling RIT with the current queue as the target queue. If the answer to the query in operation 704 is no, the mouse input has not been captured by a window, control transfers to operation 708 where the first top level window in the Z-order list of windows on the desktop 100. Control then transfers to query operation 710.

Query operation 710 asks whether the current window in the Z-order list is visible. If the current window is not visible, control transfers to operation 712, which increments a pointer to the next window in the Z-order list of windows. Control then transfers again to query operation 710 where the query is made whether the current window in the Z-order list is visible. If not, control again transfers to operation 712 and the process is repeated until a window is reached that is visible. When a visible window is finally reached, the answer in query operation 710 is yes, and control transfers to query operation 714.

Query operation 714 asks whether the pointer is located within the window rectangle. If the answer is no, control transfers back to operation 712 and a next visible window is identified, then the query in operation 714 is repeated. If the answer in query operation 714 is yes, control transfers to query operation 716.

Query operation 716 asks whether the current window has a defined window region such as region 504 shown in FIG. 5. If the answer is no, control transfers back to operation 712 and a next visible window is identified, then the query in operation 714 is repeated. If the answer in query operation 714 is yes, control transfers to query operation 716. This process repeats until query operation 716 returns a yes or the Z-order list is exhausted. If query operation 716 returns a yes, control transfers to query operation 718.

Query operation 718 asks whether the pointer location is inside the window region. If the answer is no, control transfers back to operation 712 and a next visible window is identified, then the query in operations 714 and 716 are repeated. If the answer in query operations 714 and 716 are both yes, the process repeats until query operation 718 returns a yes or the Z-order list is exhausted. If query operation 718 returns a yes, the pointer is inside the window region, control transfers to query operation 720.

Query operation 720 asks whether the window is a layered window. If the current window is a layered window, control returns to operation 712 to increment to the next window, then control passes again through query operations 710, 714, 716, and 718 and returns to query operation 720 until either the Z-order list is exhausted or an affirmative answer is given in operation 720. Control then transfers to query operation 722.

Query operation 722 asks whether the pointer is inside the layered window hit testing area. If so, control transfers to query operation 724. If the answer is no, control transfers back to operation 712 and the process from operation 712 through operations 710, 714, 716, 718, 720, and 722 until an affirmative response in operation 722 is made or the Z-order list of windows is exhausted. When a yes answer in query operation 722 is received, control transfers to operation 724 Query operation 724 asks whether the current window has children and the pointer is inside the client rectangle. If no, control transfers to return operation 706 where the current window is returned as the proper queue. On the other hand, if the answer is yes, the window does have children and the pointer is inside the client rectangle, then control transfers to operation 726 in which the first child of the current window is indexed to and control then transfers again to operation 710 to determine whether the first child window is visible. The entire process then repeats for the child windows in the Z-order list as described above, until all windows in the Z-order list are tested. Control then transfers back to the RIT. The target queue owner thread is then signaled to wake up and process the mouse input.

Figure 8:
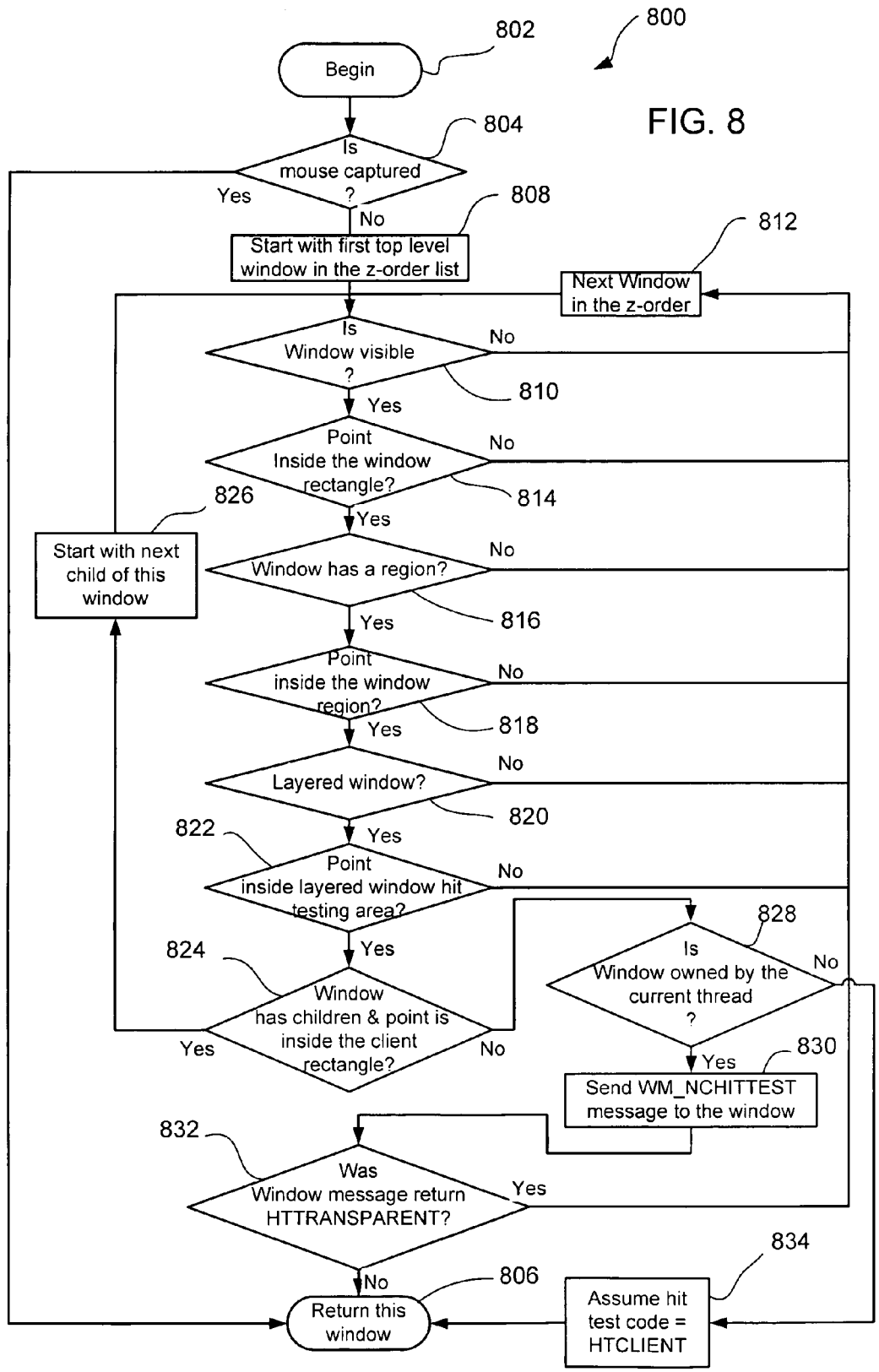
FIG. 8 is a flowchart of logical operations in a mouse full hit test routine in a simple embodiment of the present invention.

The target thread then wakes up and does a full hit test cycle 800 as shown in FIG. 8.

The full hit test cycle routine 800 begins in operation 802 when called by the thread owning the mouse input as identified in the speed hit test cycle routine 700 that is called by the RIT. Control then transfers to query operation 804 where the question is asked whether the mouse input has been captured in the current window. If the answer to the query is yes, the mouse position has been captured, control transfers to return operation 806 and control returns to the calling RIT with the current queue as the target queue. If the answer to the query in operation 804 is no, the mouse position has not been captured in the current window, control transfers to operation 808 where the first top level window in the Z-order list of windows on the desktop 100. Control then transfers to query operation 810.

Query operation 810 asks whether the current window in the Z-order list is visible. If the current window is not visible, control transfers to operation 812, which increments a pointer to the next window in the Z-order list of windows. Control then transfers again to query operation 810 where the query is made whether the current window in the Z-order list is visible. If not, control again transfers to operation 812 and the process is repeated until a window is reached that is visible. When a visible window is finally reached, the answer in query operation 810 is yes, and control transfers to query operation 814.

Query operation 814 asks whether the pointer is located within the window rectangle. If the answer is no, control transfers back to operation 812 and a next visible window is identified, then the query in operation 814 is repeated. If the answer in query operation 814 is yes, control transfers to query operation 816.

Query operation 816 asks whether the current window has a defined window region such as region 504 shown in FIG. 5. If the answer is no, control transfers back to operation 812 and a next visible window is identified, then the query in operation 814 is repeated. If the answer in query operation 814 is yes, control transfers to query operation 816. This process repeats until query operation 816 returns a yes or the Z-order list is exhausted. If query operation 816 returns a yes, control transfers to query operation 818.

Query operation 818 asks whether the pointer location is inside the window region. If the answer is no, control transfers back to operation 812 and a next visible window is identified, then the query in operations 814 and 816 are repeated. If the answer in query operations 814 and 816 are both yes, the process repeats until query operation 818 returns a yes or the Z-order list is exhausted. If query operation 818 returns a yes, the pointer is inside the window region, control transfers to query operation 820.

Query operation 820 asks whether the window is a layered window. If the current window is a layered window, control returns to operation 812 to increment to the next window, then control passes again through query operations 810, 814, 816, and 818 and returns to query operation 820 until either the Z-order list is exhausted or an affirmative answer is given in operation 820. Control then transfers to query operation 822.

Query operation 822 asks whether the pointer is inside the layered window hit testing area. If so, control transfers to query operation 824. If the answer is no, control transfers back to operation 812 and the process from operation 812 through operations 810, 814, 816, 818, 820, and 822 until an affirmative response in operation 822 is made or the Z-order list of windows is exhausted. When a yes answer in query operation 822 is received, control transfers to operation 824 Query operation 824 asks whether the current window has children and the pointer is inside the client rectangle. If the answer is yes, the window does have children and the pointer is inside the client rectangle, then control transfers to operation 826 in which the first child of the current window is indexed to and control then transfers again to operation 810 to determine whether the first child window is visible. The entire process then repeats for the child windows in the Z-order list as described above, until all windows in the Z-order list are tested. On the other hand, if the answer in query operation 824 is no, control transfers to query operation 828 which asks whether the current window is owned by the current thread. If the answer is no, control passes to operation 834. Operation 834 sets the hit test code equal to HTCLIENT and control passes to return operation 806 in which the current window is returned. If the answer in query operation 828 is yes, then control transfers to operation 830. Operation 830 sends a "WM_NCHITTEST" message to the current window. Control then transfers to query operation 832.

Query operation 832 asks whether the current window returned a message of "HTTRANSPARENT" in response to the message transmitted in operation 830. If the answer in query operation 832 is no, the current window is returned in return operation 806. If the answer is yes, control returns to operation 812 and the process is repeated until the Z-order list is exhausted or a current window is returned. The full hit test logic routine 800 is very similar to the speed hit test logic routine 700 with the exception that for the full hit test cycle, and if the mouse position falls within the non-client area of the applications, a window message (WM_NCHITTEST) is sent to the application 310 to consult it about the non-client hit test code to use. This allows applications to customize the look of their non-client area (for example, by adding more hit testable buttons, etc . . . ). The split of the hit test logic into two passes 700 and 800; the speedy and the full one is done mainly since the PIT needs to be as responsive as possible and should not block waiting for an application 310 to respond to a sent message (the WM_NCHITTEST in this case). Also note that most applications do not do any custom non-client area drawing and typically ignore the WM_NCHITTEST message that will end up being processed by the classic window manager inside the default window procedure. Since the classic window manager knows the exact layout of the non-client area, the correct hit test code is returned on behalf of the application. The mouse message is finally placed into the window message queue and the required operation completed.

The ultimate goal for input redirection in accordance with the present invention is for applications, such as application 310, to be able to continue to receive the input with total unawareness of any transformation having been applied to the window that changed its location on the screen 100. In order to optimally achieve this a two-way communication is needed between the classic window manager USER and the DWM 300. First, regarding data flowing from the DWM 300 and the classic window manager, USER, the DWM 300 needs to supply the USER with one or more of the following data:

1—For transformed windows, DWM needs to supply USER with the 2D transformation matrix for that window (via a call to UpdateWindowTransform API).

2—Since DWM might extend the window non client area outside the window rectangle to support more fancy looking window frames, DWM needs to supply USER with a region that describes the pre transformed bounding shape of the window. This region is referred to as the "new frame region".

Second, for Data flowing from the USER to the DWM 300, since the DWM 300 needs to support a more advanced non-client window area where more nontraditional window control buttons are added, for example, in the full hit test cycle routine 800, USER gives the DWM 300 the first chance to determine the non client hit test code and the option to prevent the hit test message from reaching the application message queue. This way, the DWM 300 can add more non-client area functionality that existing applications are not aware of and cannot handle. This will become more apparent from a review of the following more detailed and complex example that supports input redirection.

Input redirection related changes to the input system are divided into two main areas: hit testing changes and API level changes. Since the goal is for applications to receive input messages in the coordinate system they expect (i.e. according to where they "think" they are on the screen) regardless of their actual location/appearance on the screen after applying some transformation, hit testing logic needs to be changed to take into consideration applied window transformations. These changes are incorporated into the flowcharts in FIGS. 9 and 10.

When the mouse is captured and in contrast to the default case where the mouse messages go directly to the capturing window mouse queue, a full hit testing is needed so that the capturing window will receive the mouse message in the coordinates on the window beneath the mouse and neither in the desktop coordinate system nor the local desktop coordinate system for the capturing window. A similar sequence of operations to that described above is likewise needed to make drag and drop operations work correctly under a transformation.

Now, if the capturing window receives the mouse input messages in its local coordinate system and not in the coordinate system for the window beneath the mouse, the drag and drop logic will work only if you drag the object only within the capturing window but not for any other transformed window.

Figure 9:
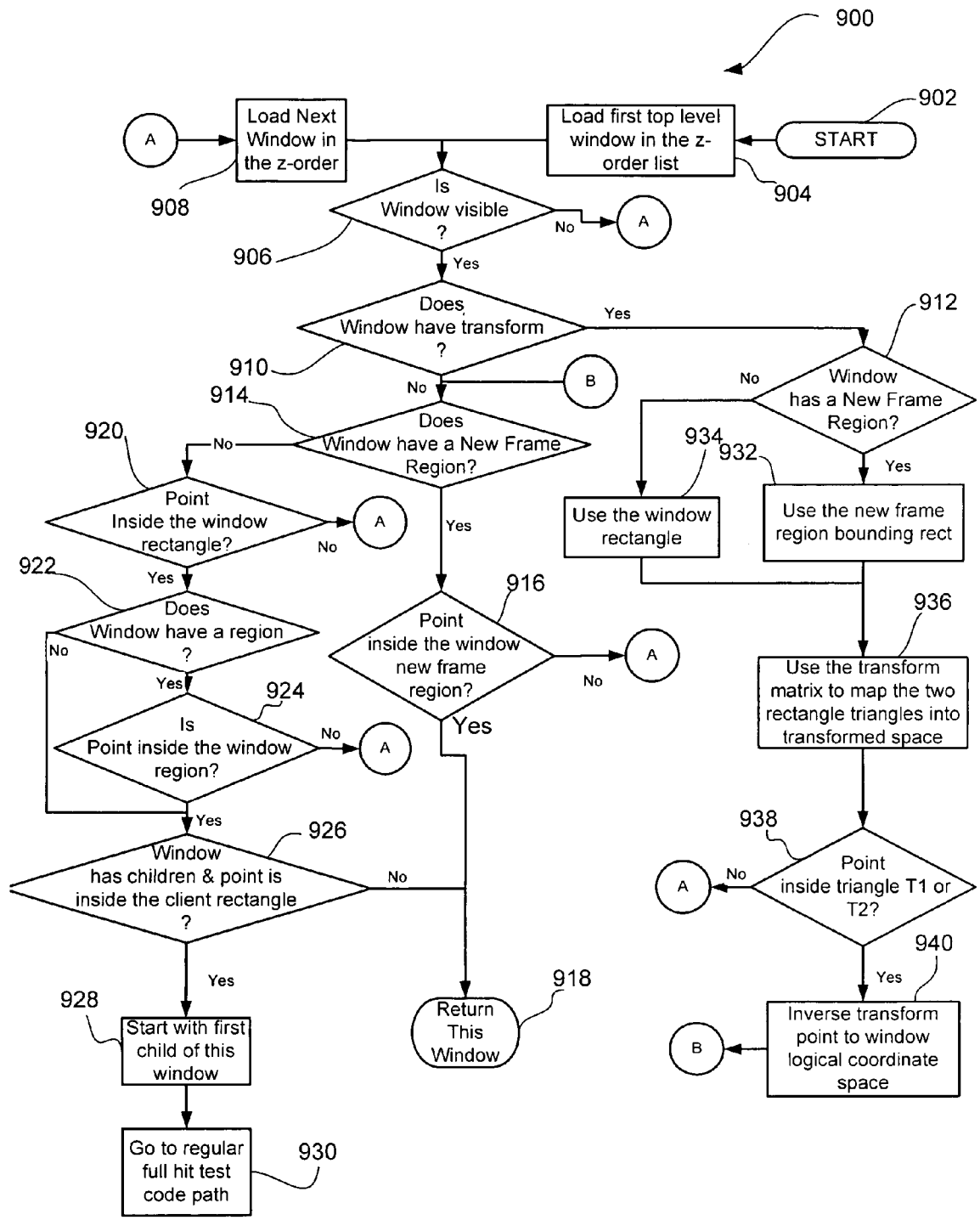
FIG. 9 is a flowchart of logical operations in a modified mouse speed hit test routine equipped to handle an arbitrary transformed window in an embodiment of the present invention.

For transformed windows, on the other hand, the speed hit testing routine (FIG. 7) in DWM 300 is modified as shown in FIG. 9 to take window transformation into consideration. This process may be summarized briefly as follows:

Map two adjoining rectangles resembling, in fact defining the bounding rectangle of the new frame region to the transformed window coordinate space using the window transformation 3D matrix.

If the mouse point falls inside any of the two rectangles, use the inverse transformation to map the mouse point from the transformed window coordinate space back to the window logical coordinate system or space.

Hit test against the new frame region in the logical coordinate system.

If the point falls within the region, the window the input belongs to and is in this window. Otherwise, continue searching the Z-order list.

Figure 10:
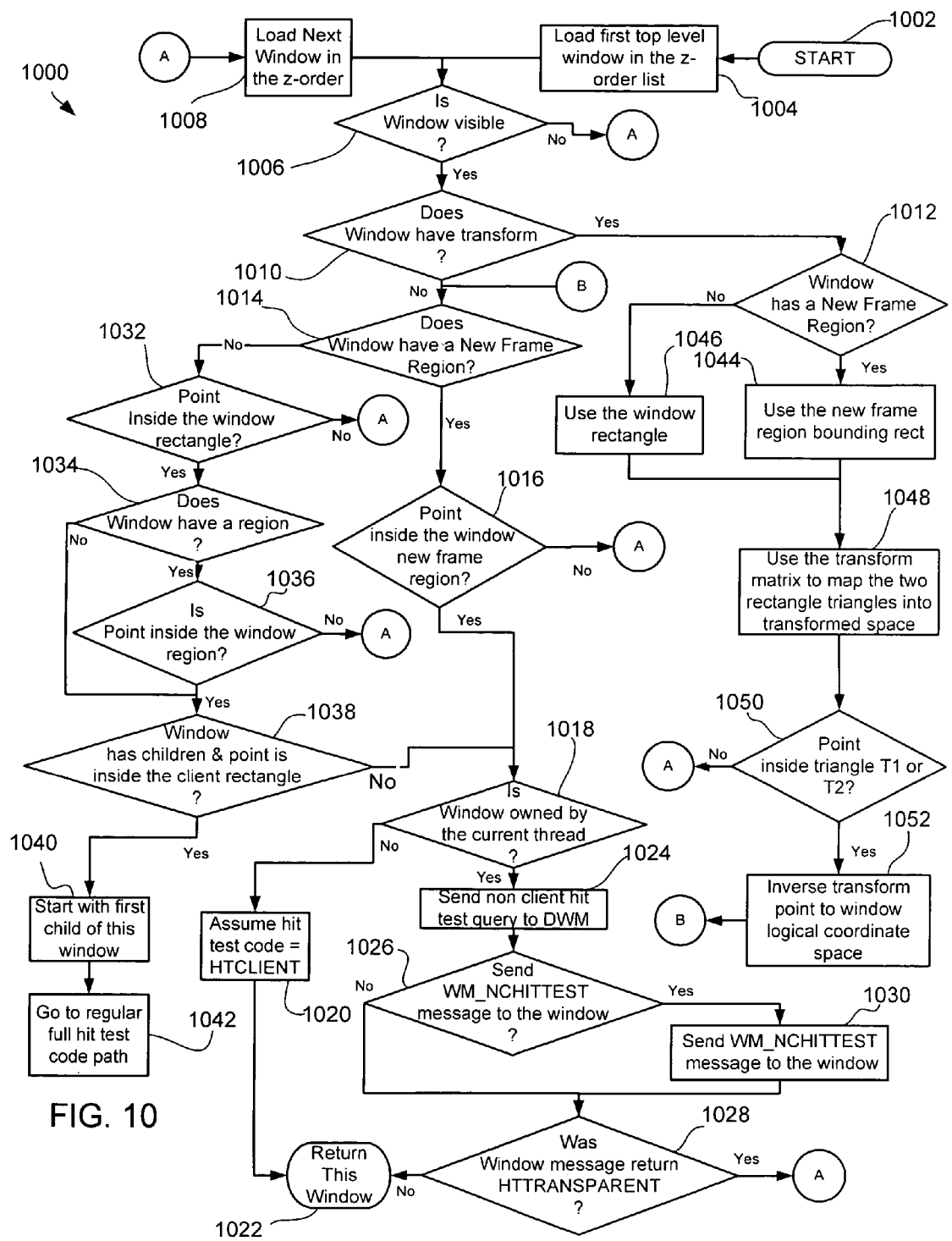
FIG. 10 is a flowchart of logical operations in a modified full hit test routine equipped to handle an arbitrary transformed window in an embodiment of the present invention.

FIG. 9 is a logical flowchart of the modified speed hit test logic routine to accommodate an arbitrary transformation such as a 3D window transformation as discussed above. Similarly, FIG. 10 is a logical flowchart of the full hit test logic to accommodate arbitrary window transformations described generally above.

Since mouse position coming from the mouse driver is used to render the mouse pointer on the screen 100 and since that position needs to be modified to meet application expectations in case of a transformed window, two separate mouse states are stored internally in USER: real mouse position and logical mouse position. The first is used to render the mouse pointer to the screen. Also, since hit testing is done in two stages: the speed hit test 900 in the context of the RIT, and the full hit test 1000 in the context of the target window thread, and since both need to start hit testing based on the physical mouse position, the window message structure in DWM 300 is modified internally to store both physical and logical mouse coordinates.

Turning now to FIG. 9, the modified speed hit test cycle routine 900 begins in operation 902 when called by the RIT and the mouse input has not been captured, as described above in routine 700. Control then transfers to operation 904 where the first top level window in the Z-order list of windows on the desktop 100. Control then transfers to query operation 906.

Query operation 906 asks whether the current window in the Z-order list is visible. If the current window is not visible, control transfers to operation 908, which increments a pointer to the next window in the Z-order list of windows. Control then transfers again to query operation 906 where the query is made whether the current window in the Z-order list is visible. If not, control again transfers to operation 908 and the process is repeated until a window is reached that is visible. When a visible window is finally reached, the answer in query operation 906 is yes, and control transfers to query operation 910. Query operation 910 asks whether the current window has a transform matrix. If the answer is yes, control transfers to query operation 912. If the answer is no, the current window has no transform matrix, control transfers to query operation 914.

Query operation 914 asks whether the current window has a New Frame Region. If the answer is yes, then control transfers to query operation 916 which asks whether the pointer location is within the New Frame Region in the current window. If the answer to the query in operation 916 is yes, then control passes to return operation 918 where the current window queue is now identified to the DWM 300.

On the other hand, in query operation 914, if the answer is no, there is no New Frame Region, control passes to query operation 920. Query operation 920 asks whether the pointer location is within the current window rectangle. If not, control transfers back to operation 908, which increments a pointer to the next window in the Z-order list of windows, and the sequence of query operations 906 and 910 are repeated until the Z-order list is exhausted. If the answer in query operation 920 is yes, the pointer location is within the current window rectangle, control transfers to query operation 922.

Query operation 922 asks whether the current window rectangle has a window region. If the answer is no, control transfers to query operation 926. If the answer is yes, control transfers to query operation 924. Query operation 924 asks whether the pointer location in the current window rectangle is within the identified window region. If the answer is no, control transfers back to operation 908, which increments a pointer to the next window in the Z-order list of windows, and the sequence of query operations 906 and 910 etc. are repeated until the Z-order list is exhausted. If the answer in query operation 924 is yes, the pointer location is inside the window region, control transfers to query operation 926.

Query operation 926 asks whether the current window has children and whether the pointer location is within the client rectangle (as in client area 404 in FIG. 4, for example). If the answer is no, control passes directly to return operation 918. If the answer is yes, control passes to operation 928 where another pointer is indexed to the first child of the current window, and control passes to operation 930. In operation 930, control is sequenced to the operational routine 1000 shown in FIG. 10 for the first child in the current window.

Back in query operation 910, if the current window does have a transform matrix, control transfers to query operation 912. In query operation 912, the question is asked whether the current window has a New Frame Region. If the answer is yes, control transfers to operation 932. Operation 932 sets the New frame Region as the bounding rectangle for the current window. Control then transfers to operation 936. If the answer in query operation 912 is no, control transfers to operation 934. In operation 934, the current window rectangle is set as the bounding rectangle. Control then passes to operation 936.

Operation 936 performs the transform matrix to map the two rectangle triangles into the transformed space. The purpose of the two triangles is to simplify the inverse conversion. Control then transfers to query operation 938.

Query operation 938 asks whether the pointer location is inside triangle T1 or T2. If the pointer location is, in fact, inside one of the triangles, control transfers to operation 940. If the pointer location is not within the triangles T1 or T2, control transfers back to operation 908, which increments a pointer to the next window in the Z-order list of windows, and the sequence of query operations 906 and 910 etc. are repeated until the Z-order list is exhausted.

In operation 940, an inverse of the transform matrix is performed on the pointer location to convert the pointer window location to window logical coordinate space. Control then transfers to query operation 914 described above.

FIG. 10 shows a full hit test logic flowchart routine 1000 similar to routine 800 described above but modified to incorporate the transform matrix of an arbitrary 3D transformation. Full hit test logic routine 1000 begins in operation 1002 when called by the thread owning the mouse input as identified in the speed hit test cycle routine 900 that is called by the RIT and the mouse input has not been captured, as described above in routine 900. Control then transfers to operation 1004 where the first top level window in the Z-order list of windows on the desktop 100 is loaded as the current window. Control then transfers to query operation 1006.

Query operation 1006 asks whether the current window in the Z-order list is visible. If the current window is not visible, control transfers to operation 1008, which increments a pointer to the next window in the Z-order list of windows. Control then transfers again to query operation 1006 where the query is made whether the current window in the Z-order list is visible. If not, control again transfers to operation 1008 and the process is repeated until a window is reached that is visible. When a visible window is finally reached, the answer in query operation 1006 is yes, and control transfers to query operation 1010. Query operation 1010 asks whether the current window has a transform matrix associated with the window. If the answer is yes, control transfers to query operation 1012. If the answer is no, the current window has no transform matrix, control transfers to query operation 1014.

Query operation 1014 asks whether the current window has a New Frame Region. If the answer is yes, then control transfers to query operation 1016 which asks whether the pointer location is within the New Frame Region in the current window. If the answer to the query in operation 1016 is yes, then control passes to query operation 1018. If the answer is no, control transfers back to operation 1008, which increments a pointer to the next window in the Z-order list of windows. Control then transfers again to query operation 1006 where the query is made whether the current window in the Z-order list is visible. If not, control again transfers back again to operation 1008 and the process is repeated until a window is reached that is visible or the Z-order list is exhausted.

Query operation 1018 asks whether the current window is owned by the current thread. If the current window is not owned by the current thread, control transfers to operation 1020. Operation 1020 sets the hit test code equal to HTCLIENT. Control then passes to return operation 1022 where the current window is returned to the calling RIT.

On the other hand, if the answer in query operation 1018 is yes, the current window is owned by the current thread, control passes to operation 1024 is which a non-client hit test query is sent to the DWM 300 and control passes to query operation 1026. Query operation 1026 asks whether the DWM 300 has responded to the non-client hit test query in operation 1024 with an instruction to send a WM_NCHITTEST message to the current window. If the answer in query operation 1026 is no, control transfers to query operation 1028. If the answer in query operation 1026 is yes, control transfers to operation 1030 in which the WM_NCHITTEST message is sent to the current window. Control then transfers to query operation 1028.

Query operation 1028 asks whether the current window returned a message HTTRANSPARENT. If the answer is yes, then control transfers again back to operation 1008, which increments a pointer to the next window in the Z-order list of windows. Control then transfers again to query operation 1006 where the query is made whether the current window in the Z-order list is visible. If not, control again transfers back again to operation 1008 and the process is repeated until a window is reached that is visible or the Z-order list is exhausted. On the other hand, if the answer in query operation 1028 is no, a message HTTRANSPARENT was not returned from the current window, control passes to return operation 1022 and the current window is returned to DWM 300 as the window location of the pointer location.

On the other hand, in query operation 1014, if the answer is no, there is no New Frame Region, control passes to query operation 1032. Query operation 1032 asks whether the pointer location is within the current window rectangle. If not, control transfers back to operation 1008, which increments a pointer to the next window in the Z-order list of windows, and the sequence of query operations 1006 and 1010 are repeated until the Z-order list is exhausted. If the answer in query operation 1032 is yes, the pointer location is within the current window rectangle, control transfers to query operation 1034.

Query operation 1034 asks whether the current window rectangle has a window region. If the answer is no, control transfers to query operation 1038. If the answer is yes, control transfers to query operation 1036. Query operation 1036 asks whether the pointer location in the current window rectangle is within the identified window region. If the answer is no, control transfers back to operation 1008, which increments a pointer to the next window in the Z-order list of windows, and the sequence of query operations 1006 and 1010 etc. are repeated until the Z-order list is exhausted. If the answer in query operation 1036 is yes, the pointer location is inside the window region, control transfers to query operation 1038.

Query operation 1038 asks whether the current window has children and whether the pointer location is within the client rectangle (as in client area 404 in FIG. 4, for example). If the answer is no, control passes directly to query operation 1018 described above. If the answer is yes, control passes to operation 1040 where another pointer is indexed to the first child of the current window, and control passes to operation 1042. In operation 1042, control is sequenced to the operational routine 1000 for the first child in the current window, and the whole sequence is repeated for the children until the Z-list is exhausted for each child.

Returning now to query operation 1010, if the current window does have a transform matrix, control transfers to query operation 1012. In query operation 1012, the question is asked whether the current window has a New Frame Region. If the answer is yes, control transfers to operation 1044. Operation 1044 sets the New frame Region as the bounding rectangle for the current window. The bounding rectangle is defined by two adjoining triangles T1 and T2. Control then transfers to operation 1048. If the answer in query operation 1012 is no, control transfers to operation 1046. In operation 1046, the current window rectangle is set as the bounding rectangle. Control then passes to operation 1048.

Operation 1048 performs the transform matrix to map the two rectangle triangles into the transformed space. The purpose of the two triangles again is to simplify the inverse conversion. Control then transfers to query operation 1050.

Query operation 1050 asks whether the pointer location is inside triangle T1 or T2. If the pointer location is, in fact, inside one of the triangles that defines the bounding rectangle, control transfers to operation 1052. If the pointer location is not within the triangles T1 or T2, control transfers back to operation 1008, which increments a pointer to the next window in the Z-order list of windows, and the sequence of query operations 1006 and 1010 etc. are repeated until the Z-order list is exhausted or return operation 1022 is reached.

In operation 1052, an inverse of the transform matrix is performed on the pointer location to convert the pointer window location to window logical coordinate space. Control then transfers to query operation 1014 and the routine proceeds as described above.

In addition, some API level changes may be necessary. USER provides many input related APIs where the return value depends in some way on the window location relative to the desktop origin. For example, applications can call a WindowFromPoint API to determine the top window in the Z-order list that contains a certain point. In a typical scenario the point passed is the mouse location on the screen 100. In other words, the application 310 wants to know what window is beneath the mouse pointer 114.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for determining whether an input message associated with an input location point belongs to a display window associated with an application, wherein the window has been transformed on the display by a transformation matrix, the method comprising:
   determining a bounding rectangle bounding the window transformed by the transformation matrix;
   determining whether the input device point is within the bounding rectangle;
   performing an inverse transformation on the input device location point if the input device point is within the bounding rectangle, wherein performing the inverse transformation results in a new frame region; and
   performing a hit test on the new frame region.

2. The method of claim 1, wherein the performing operation further comprises:
   determining whether the input device point is within a new frame region within the bounding rectangle; and
   performing the inverse transformation on the input device location point only if the input device point is within the new frame region within the bounding rectangle.

3. The method of claim 2, wherein the new frame region is the bounding rectangle and is defined by a pair of triangles.

4. The method of claim 3, wherein the determining operation further comprises:
   using the transform matrix to map the two triangles into transformed space; and
   determining whether the input device point is within one of the two triangles.

5. The method of claim 1, wherein the input location point is a mouse input point.

6. The method of claim 1, wherein the inverse transformation converts the input device location point to window logical coordinate space for transmission to the application.

7. A method for redirecting an input device message from an input device to an application via a transformed window on a display, wherein the transformed window is an application window that has been transformed on the display by a transformation matrix, the method comprising:
   receiving the input device message from the input device at an input device location point on the display;
   determining whether the location point is within the transformed window;
   if the location point is within the transformed window, performing an inverse transform on the location point into its logical coordinate system coordinates;
   performing a hit test on a new frame region in the logical coordinate system; and
   communicating the device message to the application.

8. The method of claim 7 wherein the determining operation comprises:

determining whether the input device point is within a bounding rectangle bounding the transformed window; and performing the inverse transformation on the input device location point if the input device point is within the bounding rectangle.

9. The method of claim 8 wherein the determining operation further comprises;

determining whether the input device point is within a new frame region within the bounding rectangle; and performing the inverse transformation on the input device location point only if the input device point is within the new frame region within the bounding rectangle.

10. The method of claim 9, wherein the new frame region is the bounding rectangle and the bounding rectangle is defined by two adjoining triangles.

11. The method of claim 10, wherein the determining operation further comprises:

using the transformation matrix to map the two triangles into transformed space; and determining whether the input device point is within one of the two triangles.

12. A system for maintaining an application window on a display that has been transformed by a transformation matrix into a transformed window transparent to an application that originated the application window, the system comprising:

a desktop window manager on a computer system which transforms a window transmitted by the application for display to a transformed window on the display;

a redirection transform application interface coupled to the manager, wherein the redirection transform application performs an inverse transformation that results in a new frame region and performs hit detection on the new frame region; and an external input coupled to the desktop window manager, wherein messages to and from the application pass through the transform interface to and from the manager to maintain transparency between the transformed display window and the application.

13. The system of claim 12 wherein the window manager includes an input hit testing routine to determine whether an external input message to the manager is associated with a transformed window and perform an inverse transformation on the input if the input is associated with the transformed window before sending the input message to the application.

14. The system of claim 13, wherein the external input is a mouse input.

15. The system of claim 13, wherein the external input is an input message from another application.

16. The system of claim 13, wherein the input hit test routine comprises a speed hit test routine and a full hit test routine in order to timely process the external input message.

17. A computer storage medium encoding a computer program of instructions for performing a method for redirecting an input device message from an input device to an application via a transformed window on a display, wherein the transformed window is an application window that has been transformed on the display by a transformation matrix, by a computer system, said method comprising:

determining a bounding rectangle bounding the window transformed by the transformation matrix;

determining whether the input device point is within the bounding rectangle; and performing an inverse transformation on the input device location point if the input device point is within the bounding rectangle, wherein performing the inverse transformation results in a new frame region; and performing a hit test on the new frame region.

18. The computer storage medium of claim 17, wherein the performing operation further comprises:

determining whether the input device point is within a new frame region within the bounding rectangle; and performing the inverse transformation on the input device location point only if the input device point is within the new frame region within the bounding rectangle.

19. The computer storage medium of claim 17, wherein the determining operation further comprises:

using the transform matrix to map two triangles defining the bounding rectangle into transformed space; and determining whether the input device point is within one of the two triangles.

20. The computer storage medium of claim 17, the method further comprising:

communicating the device message to the application.

* * * * *

UNITED STATES PATENT AND TRADEMARK OFFICE
CERTIFICATE OF CORRECTION

| | | |
|---|---|---|
| PATENT NO. | : 7,412,662 B2 | Page 1 of 1 |
| APPLICATION NO. | : 10/823276 | |
| DATED | : August 12, 2008 | |
| INVENTOR(S) | : Mohamed Sadek et al. | |

It is certified that error appears in the above-identified patent and that said Letters Patent is hereby corrected as shown below:

In column 17, line 8, in Claim 9, delete "comprises;" and insert -- comprises: --, therefor.

Signed and Sealed this
Third Day of May, 2011

David J. Kappos
*Director of the United States Patent and Trademark Office*